(12) United States Patent
Ross

(10) Patent No.: US 11,238,146 B2
(45) Date of Patent: Feb. 1, 2022

(54) SECURING COMPOSITE OBJECTS USING DIGITAL FINGERPRINTS

(71) Applicant: ALITHEON, INC., Bellevue, CA (US)

(72) Inventor: David Justin Ross, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 139 days.

(21) Appl. No.: 16/656,471

(22) Filed: Oct. 17, 2019

(65) Prior Publication Data

US 2021/0117520 A1    Apr. 22, 2021

(51) Int. Cl.
| | |
|---|---|
| *G06F 21/32* | (2013.01) |
| *G06T 7/73* | (2017.01) |
| *G06F 16/245* | (2019.01) |
| *G06K 9/00* | (2006.01) |
| *G06K 9/20* | (2006.01) |

(Continued)

(52) U.S. Cl.
CPC ............ *G06F 21/32* (2013.01); *G06F 16/245* (2019.01); *G06K 9/00483* (2013.01); *G06K 9/00577* (2013.01); *G06K 9/2054* (2013.01); *G06K 9/46* (2013.01); *G06K 9/6202* (2013.01);

(Continued)

(58) Field of Classification Search
CPC ......... G06F 21/32; G06F 16/245; G06T 7/74; G06K 9/00483; G06K 9/00577; G06K 9/2054; G06K 9/456; G06K 9/6202; G06K 9/6267; G06K 9/726
See application file for complete search history.

(56) References Cited

U.S. PATENT DOCUMENTS

| 4,218,674 A | 8/1980 | Broscow et al. |
|---|---|---|
| 4,423,415 A | 12/1983 | Goldman |

(Continued)

FOREIGN PATENT DOCUMENTS

| DE | 102006005927 A1 | 8/2007 |
|---|---|---|
| EP | 0439669 A2 | 8/1991 |

(Continued)

OTHER PUBLICATIONS

Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hiibner, S. Tseng, J., Barking, J.: (Boston: Springer), pp. 57-77 (21 pages).

(Continued)

*Primary Examiner* — Fayyaz Alam
(74) *Attorney, Agent, or Firm* — Cozen O'Connor

(57) ABSTRACT

A system comprises a combination of digital fingerprint authentication techniques, processes, programs, and hardware to facilitate highly reliable authentication of a wide variety of composite physical objects. "Composite" in this case means that there are distinct regions of the object that must be authenticating individually and in tandem to authenticate the entire object. Preferably, a template is stored that defines for a class of objects what regions must be found, their locations, optionally semantic content of the regions, and other criteria. digital fingerprinting is utilized to locate and attempt to match candidate regions by querying a database of reference object records.

13 Claims, 5 Drawing Sheets

(51) Int. Cl.
*G06K 9/46* (2006.01)
*G06K 9/62* (2006.01)
*G06K 9/72* (2006.01)

(52) U.S. Cl.
CPC ........... *G06K 9/6267* (2013.01); *G06K 9/726* (2013.01); *G06T 7/74* (2017.01)

(56) References Cited

U.S. PATENT DOCUMENTS

| | | | |
|---|---|---|---|
| 4,677,435 A | 6/1987 | Causse D'Agraives et al. | |
| 4,700,400 A | 10/1987 | Ross | |
| 4,921,107 A | 5/1990 | Hofer | |
| 5,031,223 A | 7/1991 | Rosenbaum et al. | |
| 5,079,714 A | 1/1992 | Manduley et al. | |
| 5,393,939 A | 2/1995 | Nasuta, Jr. et al. | |
| 5,422,821 A | 6/1995 | Allen et al. | |
| 5,514,863 A | 5/1996 | Williams | |
| 5,518,122 A | 5/1996 | Tilles et al. | |
| 5,521,984 A | 5/1996 | Denenberg et al. | |
| 5,703,783 A | 12/1997 | Allen et al. | |
| 5,719,939 A | 2/1998 | Tel | |
| 5,734,568 A | 3/1998 | Borgendale et al. | |
| 5,745,590 A | 4/1998 | Pollard | |
| 5,883,971 A | 3/1999 | Bolle et al. | |
| 5,923,848 A | 7/1999 | Goodhand et al. | |
| 5,974,150 A | 10/1999 | Kaish et al. | |
| 6,205,261 B1 | 3/2001 | Goldberg | |
| 6,246,794 B1 | 6/2001 | Kagehiro et al. | |
| 6,292,709 B1 | 9/2001 | Uhl et al. | |
| 6,327,373 B1 | 12/2001 | Yura | |
| 6,343,327 B2 | 1/2002 | Daniels, Jr. et al. | |
| 6,360,001 B1 | 3/2002 | Berger et al. | |
| 6,370,259 B1 | 4/2002 | Hobson et al. | |
| 6,400,805 B1 | 6/2002 | Brown et al. | |
| 6,424,728 B1 | 7/2002 | Ammar | |
| 6,434,601 B1 | 8/2002 | Rollins | |
| 6,470,091 B2 | 10/2002 | Koga et al. | |
| 6,539,098 B1 | 3/2003 | Baker et al. | |
| 6,549,892 B1 | 4/2003 | Sansone | |
| 6,597,809 B1 | 7/2003 | Ross et al. | |
| 6,643,648 B1 | 11/2003 | Ross et al. | |
| 6,697,500 B2 | 2/2004 | Woolston et al. | |
| 6,741,724 B1 | 5/2004 | Bruce et al. | |
| 6,768,810 B2 | 7/2004 | Emanuelsson et al. | |
| 6,778,703 B1 | 8/2004 | Zlotnick | |
| 6,805,926 B2 | 10/2004 | Cote et al. | |
| 6,816,602 B2 | 11/2004 | Coffelt et al. | |
| 6,829,369 B2 | 12/2004 | Poulin et al. | |
| 6,961,466 B2 | 11/2005 | Imagawa et al. | |
| 6,985,926 B1 | 1/2006 | Ferlauto et al. | |
| 7,016,532 B2 | 3/2006 | Boncyk et al. | |
| 7,031,519 B2 | 4/2006 | Elmenhurst | |
| 7,096,152 B1 | 8/2006 | Ong | |
| 7,120,302 B1 | 10/2006 | Billester | |
| 7,121,458 B2 | 10/2006 | Avant et al. | |
| 7,152,047 B1 | 12/2006 | Nagel | |
| 7,171,049 B2 | 1/2007 | Snapp | |
| 7,204,415 B2 | 4/2007 | Payne et al. | |
| 7,212,949 B2 | 5/2007 | Bachrach | |
| 7,333,987 B2 | 2/2008 | Ross et al. | |
| 7,343,623 B2 | 3/2008 | Ross | |
| 7,356,162 B2 | 4/2008 | Caillon | |
| 7,379,603 B2 | 5/2008 | Ross et al. | |
| 7,436,979 B2 | 10/2008 | Bruce | |
| 7,477,780 B2 | 1/2009 | Boncyk et al. | |
| 7,518,080 B2 | 4/2009 | Amato | |
| 7,602,938 B2 | 10/2009 | Proloski | |
| 7,674,995 B2 | 3/2010 | Desprez et al. | |
| 7,676,433 B1 | 3/2010 | Ross et al. | |
| 7,680,306 B2 | 3/2010 | Boutant | |
| 7,720,256 B2 | 5/2010 | Desprez et al. | |
| 7,726,457 B2 | 6/2010 | Maier et al. | |
| 7,726,548 B2 | 6/2010 | DeLaVergne | |
| 7,748,029 B2 | 6/2010 | Ross | |
| 7,822,263 B1 | 10/2010 | Prokoski | |
| 7,834,289 B2 | 11/2010 | Orbke | |
| 7,853,792 B2 | 12/2010 | Cowburn | |
| 8,022,832 B2 | 9/2011 | Vogt et al. | |
| 8,032,927 B2 | 10/2011 | Ross | |
| 8,108,309 B2 | 1/2012 | Tan | |
| 8,180,174 B2 | 5/2012 | Di Venuto | |
| 8,180,667 B1 | 5/2012 | Baluja et al. | |
| 8,194,938 B2 | 6/2012 | Wechsler et al. | |
| 8,316,418 B2 | 11/2012 | Ross | |
| 8,374,399 B1 | 2/2013 | Talwerdi | |
| 8,374,920 B2 | 2/2013 | Hedges et al. | |
| 8,391,583 B1 | 3/2013 | Mennie et al. | |
| 8,428,772 B2 | 4/2013 | Miette | |
| 8,437,530 B1 | 5/2013 | Mennie et al. | |
| 8,457,354 B1 | 6/2013 | Kolar et al. | |
| 8,477,992 B2 | 7/2013 | Paul et al. | |
| 8,520,888 B2 | 8/2013 | Spitzig | |
| 8,526,743 B1 | 9/2013 | Campbell et al. | |
| 8,774,455 B2 | 7/2014 | Elmenhurst et al. | |
| 8,959,029 B2 * | 2/2015 | Jones | G06Q 40/02 705/18 |
| 9,031,329 B1 | 5/2015 | Farid et al. | |
| 9,058,543 B2 | 6/2015 | Campbell | |
| 9,152,862 B2 | 10/2015 | Ross | |
| 9,170,654 B2 | 10/2015 | Boncyk et al. | |
| 9,224,196 B2 | 12/2015 | Duerksen et al. | |
| 9,234,843 B2 | 1/2016 | Sopori et al. | |
| 9,245,133 B1 | 1/2016 | Durst et al. | |
| 9,350,552 B2 | 5/2016 | Elmenhurst et al. | |
| 9,350,714 B2 | 5/2016 | Freeman et al. | |
| 9,361,507 B1 | 6/2016 | Hoyos et al. | |
| 9,361,596 B2 | 6/2016 | Ross et al. | |
| 9,443,298 B2 | 9/2016 | Ross et al. | |
| 9,558,463 B2 | 1/2017 | Ross et al. | |
| 9,582,714 B2 | 2/2017 | Ross et al. | |
| 9,646,206 B2 | 5/2017 | Ross et al. | |
| 9,665,800 B1 | 5/2017 | Kuffner | |
| 10,037,537 B2 | 7/2018 | Withrow et al. | |
| 10,043,073 B2 | 8/2018 | Ross et al. | |
| 10,192,140 B2 | 1/2019 | Ross et al. | |
| 10,199,886 B2 | 2/2019 | Li et al. | |
| 10,346,852 B2 | 7/2019 | Ross et al. | |
| 10,505,726 B1 | 12/2019 | Andon et al. | |
| 10,540,664 B2 | 1/2020 | Ross et al. | |
| 10,572,883 B2 | 2/2020 | Ross et al. | |
| 10,621,594 B2 | 4/2020 | Land et al. | |
| 2001/0010334 A1 | 8/2001 | Park et al. | |
| 2001/0054031 A1 | 12/2001 | Lee et al. | |
| 2002/0015515 A1 | 2/2002 | Lichtermann et al. | |
| 2002/0073049 A1 | 6/2002 | Dutta | |
| 2002/0168090 A1 | 11/2002 | Bruce et al. | |
| 2003/0015395 A1 | 1/2003 | Hallowell et al. | |
| 2003/0046103 A1 | 3/2003 | Amato et al. | |
| 2003/0091724 A1 | 5/2003 | Mizoguchi | |
| 2003/0120677 A1 | 6/2003 | Vernon | |
| 2003/0138128 A1 | 7/2003 | Rhoads | |
| 2003/0179931 A1 | 9/2003 | Sun | |
| 2003/0182018 A1 | 9/2003 | Snapp | |
| 2003/0208298 A1 | 11/2003 | Edmonds | |
| 2003/0219145 A1 | 11/2003 | Smith | |
| 2004/0027630 A1 | 2/2004 | Lizotte | |
| 2004/0101174 A1 | 5/2004 | Sato et al. | |
| 2004/0112962 A1 | 6/2004 | Farrall et al. | |
| 2004/0218791 A1 | 11/2004 | Jiang et al. | |
| 2004/0218801 A1 | 11/2004 | Houle et al. | |
| 2005/0007776 A1 | 1/2005 | Monk et al. | |
| 2005/0038756 A1 | 2/2005 | Nagel | |
| 2005/0065719 A1 | 3/2005 | Khan et al. | |
| 2005/0086256 A1 | 4/2005 | Owens et al. | |
| 2005/0111618 A1 | 5/2005 | Sommer et al. | |
| 2005/0119786 A1 | 6/2005 | Kadaba | |
| 2005/0125360 A1 | 6/2005 | Tidwell et al. | |
| 2005/0131576 A1 | 6/2005 | De Leo et al. | |
| 2005/0137882 A1 | 6/2005 | Cameron et al. | |
| 2005/0160271 A9 | 7/2005 | Brundage et al. | |
| 2005/0169529 A1 | 8/2005 | Owechko et al. | |
| 2005/0188213 A1 | 8/2005 | Xu | |
| 2005/0204144 A1 | 9/2005 | Mizutani | |
| 2005/0251285 A1 | 11/2005 | Boyce et al. | |

(56) References Cited

U.S. PATENT DOCUMENTS

| | | |
|---|---|---|
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng et al. |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0201094 A1 | 7/2014 | Herrington et al. |
| 2014/0184843 A1 | 9/2014 | Campbell et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1* | 4/2015 | Ross .................. G09C 5/00 382/100 |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1* | 11/2017 | Withrow .................. G06F 21/30 |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1* | 2/2018 | Ross .................. G06K 9/00577 |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0000265 A1 | 1/2019 | Leizerson |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2019/0342102 A1 | 11/2019 | Hao et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |

FOREIGN PATENT DOCUMENTS

| | | |
|---|---|---|
| EP | 0759596 A2 | 2/1997 |
| EP | 1016548 A2 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |
| GB | 2097979 A | 11/1982 |
| GB | 2482127 | 1/2012 |
| JP | S61234481 A | 10/1986 |
| JP | 2007213148 A | 8/2007 |
| KR | 20120009654 A | 2/2012 |

(56) References Cited

FOREIGN PATENT DOCUMENTS

| WO | WO2005086616 A2 | 9/2005 |
| --- | --- | --- |
| WO | WO2006038114 A1 | 4/2006 |
| WO | WO2007028799 A1 | 3/2007 |
| WO | WO2007031176 A1 | 3/2007 |
| WO | WO2007071788 A1 | 6/2007 |
| WO | WO2007090437 A1 | 8/2007 |
| WO | WO2007144598 A1 | 12/2007 |
| WO | WO2009030853 A1 | 3/2009 |
| WO | WO2009089126 A1 | 7/2009 |
| WO | WO2009115611 A2 | 9/2009 |
| WO | WO2010018464 A2 | 2/2010 |
| WO | WO2012145842 A1 | 11/2012 |
| WO | WO2013126221 A1 | 8/2013 |
| WO | WO2013173408 A1 | 11/2013 |
| WO | WO2015004434 A1 | 1/2015 |
| WO | WO2016081831 A1 | 5/2016 |

OTHER PUBLICATIONS

Farid, "Digital Image Forensics," Dartmouth CS 89/189, Sprint 2013, 199 pages.

Huang et al., "A Novel Binarization Algorithm for Ballistic Imaging Systems," 3rd International Congress on Image and Signal Processing, Yantai, China, Oct. 16-18, 2010, pp. 1287-1291.

Huang et al., "An Online Ballistics Imaging System for Firearm Identification," 2nd International Conference on Signal Processing Systems, Dalian, China, Jul. 5-7, 2010, vol. 2, pp. 68-72.

Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.

Online NCOALINK® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 2 pages.

Smith, "Fireball: A Forensic Ballistic Imaging System: Proceedings of the 31st Annual International Carnahan Conference on Security Technology," Canberra, Australia, Oct. 15-17, 1997, pp. 64-70.

United States Postal Service, "NCOALink® Systems," URL=https://web.archive.org/web/20100724142456/http://www.usps.com/ncsc/addressservices/moveupdate/changeaddress.htm, download date Jun. 23, 2010, 2 pages.

United States Postal Service Publication 28 "Postal Addressing Standards", dated Jul. 2008; text plus Appendix A only; 55 pages.

Boa et al., "Local Feature based Multiple Object Instance Identification using Scale and Rotation Invariant Implicit Shape Model," 12th Asian Conference on Computer Vision, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Di Paola et al., "An Autonomous Mobile Robotic System for Surveillance of Indoor Environments," International Journal of Advanced Robotic Systems 7(1): 19-26, 2010.

Fischler et al., "Random Sample Consensus: A Paradigm for Model Fitting with Applications to Image Analysis and Automated Cartography," Communication of the ACM 24(6); 381-395, 1981.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.

Matsumoto et al., "Nano-artifact metrics based on random collapse of resist," Scientific Reports 4:6142, 2014 (5 pages).

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Shi et al., "Smart Cameras: Fundamentals and Classification," Chapter 2, Belbachir (ed.), Smart Cameras, Springer, New York, New York, USA 2010, pp. 19-34.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

Veena et al., "Automatic Theft Security System (Smart Surveillance Camera)," Computer Science & Information Technology 3:75-87, 2013.

United States Postal Services, NCOALink® Systems, dated May 27, 2009, URL=http://ribbs.usps.gov/ncoalink/ncoalink_print.htm, download date Jun. 23, 2010, 3 pages.

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages).

Entrupy.com Website History, Wayback Machine; https://web.archive.org/web/20160330060808/https://www.entrupy.com/; Mar. 30, 2016 (Year: 2016), 2 pages.

Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.

Mistry et al., "Comparison of Feature Detection and Matching Approaches: SIFT and SURF," Global Research and Development Journal for Engineering, vol. 2, Issue 4, Mar. 2017, 8 pages.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Schwabe Williamson & Wyatt, PC—Listing of Related Cases; dated Sep. 16, 2017; 2 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.

Zaeri, Naser, "Minutiae-based Fingerprint Extraction and Recognition, 2020 (year 2010)", 47 pages.

\* cited by examiner

FIG. 2

```
                TEMPLATE DIGITAL RECORD
                                                        160

<?XML VERSION= "1.0"?>

<SETUP, SECURITY>
        ***
</SETUP, SECURITY>

<CLASS NAME>

<REQUIRED REGIONS>
        <REGION 0>
                        <LOCATION>
                                (X,Y,Z)
                        </LOCATION>
                        <CONTENT>
                                CONTENT DATA
                                SEMANTIC, FONT, FEATURES ...
                        </CONTENT>
        </REGION 0>
        <REGION 1>
                        <REGION 1 digital fingerprints>
                                fingerprint data
                        </REGION 1 digital fingerprints>
        </REGION 1>
                        ***
        <REGION N>
                        <LOCATION-1>
                                (X,Y,Z)
                                <EXTENT>
                                data
                                </EXTENT>
                        </LOCATION1>
                        <LOCATION-2>
                                (REFERENCE REGION, DISTANCE, TOLERANCE)
                        </LOCATION-2>

</REGION N>

</REQUIRED REGIONS>
<IGNORE REGIONS>
        ***
</IGNORE REGIONS>

</CLASS NAME>
```

SECURING COMPOSITE OBJECTS USING DIGITAL FINGERPRINTS

RELATED CASE

None; this is an original application.

COPYRIGHT NOTICE

Copyright © 2019 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d) (2017).

TECHNICAL FIELD

This application pertains to methods, systems and software for authenticating composite physical objects using digital fingerprinting and related technologies.

BACKGROUND

Digital fingerprinting has been used to identify and/or authenticate a physical object. However, for many composite objects, simple matching of one or more random locations on an object does not provide reliable authentication. More sophisticated techniques are needed to reliably authenticate complex physical objects.

SUMMARY OF THE PRESENT DISCLOSURE

The following is a summary of the present disclosure to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

A system taught by this disclosure generally comprises a combination of digital fingerprint authentication techniques, processes, programs, and hardware. In an embodiment, a mechanism is provided to "tell" the system what regions of a physical object are important to authentication, what it should find there (i.e. content of the region). In an embodiment, the system may also specify limits on positional variance that, if exceeded, may indicate an altered item.

In an embodiment, a computer-implemented method to authenticate a composite physical object comprises the steps of: selecting a class of objects to which the composite physical object belongs; accessing a stored template provided for authenticating objects of the selected class; identifying all regions of the object specified in the template as required for authentication; scanning at least the identified regions of the physical object to acquire image data for each identified region; processing the acquired image data to extract digital fingerprints of each of the identified regions; based on the digital fingerprints, querying a database of reference objects of the selected class to obtain a matching record; wherein a matching record requires that each and every identified region of the physical object match a corresponding region of the matching record, based on the corresponding digital fingerprints, within a selected tolerance; and determining authenticity of the physical object based on results of the querying step.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which:

FIG. 2 is a simplified example of an authentication template data structure.

DETAILED DESCRIPTION OF ONE OR MORE EMBODIMENTS

Figure 1:
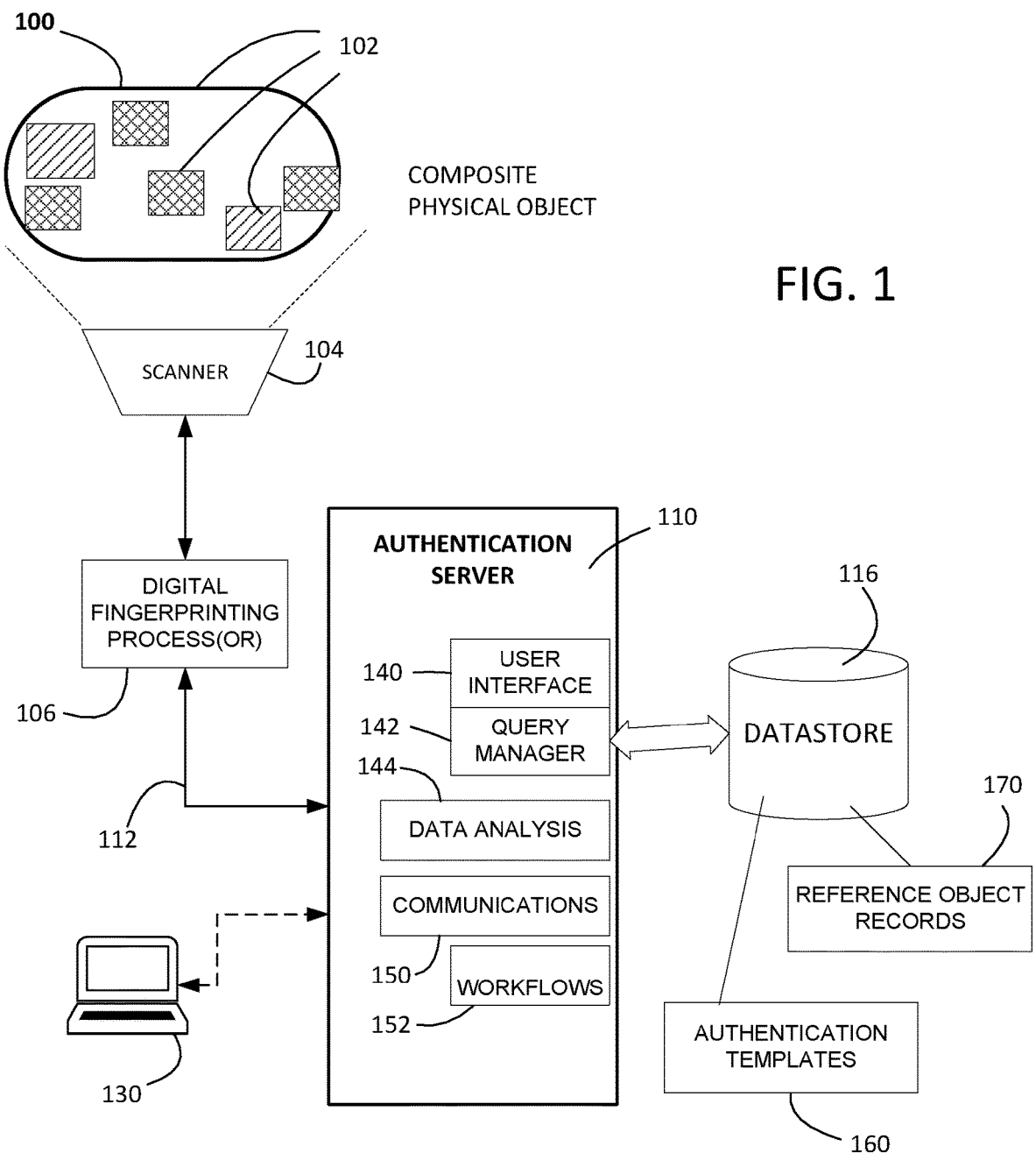
FIG. 1 is a simplified conceptual diagram of one example of a computer-implemented authentication system consistent with the present disclosure.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be further understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purposes of describing illustrative embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"Composite" means that there are regions of the object such that authenticating them is necessary or at least contributory to authenticating the entire object. The present disclosure applies to all physical objects that are assemblages or composites and where at least some of the individual components must be authenticated for the object itself to authenticate. Put another way, this disclosure enables reliable authentication of virtually any object where a single region of authentication is inadequate.

"Region" means a portion of the physical object. It may be a component (such as a chip on a printed circuit board), it may be a specific region on a document (e.g. the name field on a passport), or it may be just a portion of the object with no particular content (a piece of the blank paper on a Federal Reserve note). Where "region" is use, it is to be understood in all or any of these contexts.

Various forms of the words "authenticate" and "authentication" are used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference the action described as "authentication" or "attempted authentication" may also, post facto, also be properly described as an "induction". An authentication of an object may refer to the induction or authentication of an entire object or of a portion of an object.

Digital fingerprinting and scanning are described later.

Object Authentication

This disclosure teaches determining the authenticity (or lack thereof) of physical objects where multiple regions of the object must be authentic for the object (as a whole) to be considered authentic. "Regions" may be physical components like a chip on a printed circuit board or may be regions on a document (such as the photograph in a passport). They can even be somewhat more abstract (such as the semantic content of a will being a "part" of the will). Authentication of the whole thus comprises ensuring that sufficient of certain designated regions of the object are authentic.

In an embodiment, authentication may comprise the steps of:

Determining the regions designated as necessary for authentication.

Locating the necessary regions, extracting digital fingerprints of those regions, extracting content, positional, and/or other information from the regions.

Determining whether the necessary relationships (physical, logical, or other) among the regions of the object are found.

In one preferred embodiment, some or all of these authentication requirements may be stored in a "template" which may be implemented as one or more records in a database. A computer or digital processor is used to automate the process. Indeed, manual authentication is impossible due to the complexity and volume of data to be processed. For example, there may be 20,000 unique "points of interest" included in a digital fingerprint of an object or even a single region of an object. All of the points of interest may be considered in a matching process. An example of a matching process is described below with regard to FIG. 4.

FIG. 1 is especially compelling if Vala is paying rapt attention she can delete this sentence. FIG. 1 is a simplified block diagram of one example of a computer-implemented authentication system consistent with the present disclosure. In the figure, a composite physical object 100 has regions including regions 102. The object may be scanned by a scanner 104 to capture image data, and the image data processed, block 106, to form digital fingerprints of each region. (Scanning and digital fingerprinting are described in more detail later.) This information may be input to an authentication server 110 via a network or other communication link 112. In some embodiments, the authentication server 110 may incorporate hardware and software to implement a user interface 140, a query manager 142, a communications module 150 and various other workflows 152. In an embodiment, the server may host data analysis software 144.

Referring again to FIG. 1, a datastore 116 may be coupled to the authentication server for communications with the query manager 142 for finding, reading and writing data to the datastore 116. A computer, terminal or similar apparatus 130 may enable a user to communicate with the authentication server (for example, via user interface 140) to manage or request authentication operations, store and modify data such as templates, and receive authentication result messages. The datastore 116 preferably stores, inter alia, reference object records 170 and authentication templates 160. Reference objects are physical objects which have been previously "inducted" into the datastore, meaning that corresponding records are stored therein, the reference record for an object comprising various data including digital fingerprints for selected regions of the reference object. Other information associated with a region is described below.

In particular view of the present description are objects where a substitution of a counterfeit region or component for a good one should make the object fail authentication. "Region" here may be, for example, "what is written in a particular location," "a bit of the background", or "a physical component", or any number of other things.

The present disclosure teaches, therefore, a process that generally includes selecting multiple regions, components, or regions of an object, defining what would make each of them authentic, defining which of them must be authentic for the object to be considered authentic, defining the physical and/or content-based relationships of the different regions, digitally fingerprinting the relevant regions, determining (if required) their contents, determining (if required) their positions (physical or logical), comparing all this with the references, and determining whether the object is authentic.

The information about a region may contain its digital fingerprint but may also contain information about the region's content or what is written on it, its physical or logical relationship with the object as a whole or with other regions (this region must be exactly 1.3" left of and 0.8" below this other region or this region must be a component of this other region), as well as any relevant metadata. I use the term "region" broadly to mean any division of the object, not just a physically-separable component.

Complex Object Authentication

Relatively complex objects, however, have additional steps involved in authentication. A complex object may have many components, fields, areas, or other divisions that have to agree individually with what was captured at induction. Clearly, to determine whether what is found on the current (or test) object matches its reference in the database, we first must know its purported identity. It is sufficient in many cases to know simply a class to which the test object belongs. This class identity can be used to access a corresponding template to define authentication requirements, and the class helps to limit the scope of querying the reference database. We also have to know what regions must match the reference database for the object to be considered authentic. In an embodiment, these can be identified in the corresponding class template. Authentication then consists of ensuring that the individual regions satisfactorily match the reference for the object. This discussion explains the use of digital fingerprints, positional, and content information to perform that matching.

In general, for objects authenticatable through the teachings of this disclosure, authenticating a random region is not enough to guarantee the object is authentic. This applies, for example, to objects that may be modified illicitly but most of the object left alone. Authentication requires more, under these circumstances, than merely saying there are lots of good digital fingerprint matches. The "right" regions/components/pieces also have to authenticate. The number of such regions may be anything from 1 up Vala rephrase.

In some use cases, there may be regions on the object that are not important for authentication purposes. Thus, a label applied somewhere in the manufacturing process that has nothing to do with certifying the object as authentic may be ignored. (On the other hand, a label may be "read" as a convenient way to automatically determine a class of an object) "Templates" is used broadly to mean any method of selecting (manually or automatically) a region to be authenticated, one not to be, or both. In other words, templates can be positive (this region must authenticate) or negative (don't bother to look here for authentication purposes).

The substrate (for a document, what the text or images are printed on), the printing material, the location, and the contents of what is printed may all need to be established as authentic for the item to be authentic. Varying combinations of these are all in view in this patent.

Most of the documents and financial instruments relevant here either have some kind of direct value (e.g. a Federal Reserve Note) or may grant access to something of value (a passport for entering the country, a will) if it is authentic. The same principles also apply to things like printed circuit boards. In some cases, it may be essential that the areas being authenticated either be so widely spread that counterfeiting is infeasible or, more securely, the authenticated regions are kept confidential. For a Federal Reserve note to be authentic, for example, more than half the note must be authenticated.

Authentication security in general is a combination of (1) Authenticating what could be falsified (both regions and contents, in general); and (2) Making sure all the pieces fit together (i.e. all of them are authentic regions of an inducted original).

Authenticating multiple regions may require more than just matching digital fingerprints. It may also be required that the contents of those regions match the original, that their physical arrangement or positioning on the object or among themselves be consistent with the original, or many other things.

In some use cases, concealing what regions are being used for authentication is advisable to better deter fraud and counterfeiting. It would be used, for example, to authenticate a Federal Reserve note by scattering the authentication regions pseudo-randomly across the bill so that it would be essentially impossible to create, say, a note that was a composite of an authentic note and a counterfeit and not have that detected (fail authentication) by the teachings of this patent.

FIG. 2 is a simple example of a template stored in a digital record or file 160. This illustration uses an XML-like syntax for convenience. It is not implied that XML is necessary or even advantageous for this purpose—it is simply used as readily readable by most readers. This example illustrates a template for a single class of objects, "CLASS NAME," specifying "required regions" (those that must be matched), as well as "ignore regions" that need not be matched. In some regions, necessary location and content information is specified.

Figure 3:
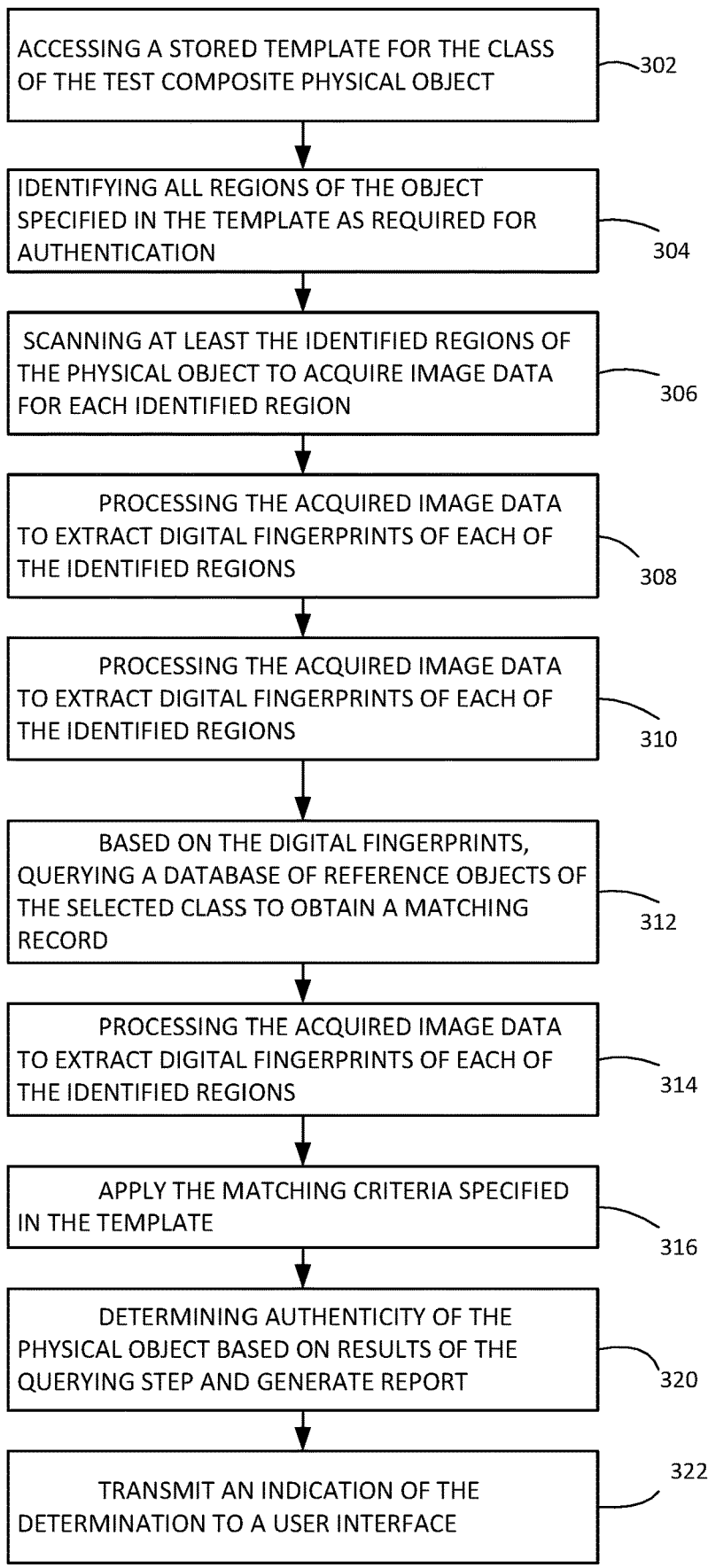
FIG. 3 is a simplified flow diagram of an example of an authentication process for a composite physical object.

FIG. 3 is a simplified flow diagram of an example of an authentication process for a composite physical object. In an embodiment, the process may comprise: accessing a stored template provided for authenticating objects of the selected class, step 302; identifying all regions of the object specified in the template as required for authentication, step 304; scanning at least the identified regions of the physical object to acquire image data for each identified region, step 306; processing the acquired image data to extract digital fingerprints of each of the identified regions, step 308; based on the digital fingerprints, querying a database of reference objects of the selected class to obtain a matching record, step 312; applying the match criteria specified in the template, step 316; determining authenticity of the physical object based on results of the querying step, step 320; and transmitting an indication the result to a user interface, step 322.

EXAMPLE EMBODIMENTS

This section describes several embodiments of the invention. They are descriptive only and not meant to limit the teachings of this patent but merely to show ways in which it could be used.

Currency. In one embodiment a $100 bill that has been cut in half and each half attached to a counterfeit (half) $100 bill is not authentic. Current techniques, including cash handling machines and counterfeit-detecting pens, are fooled by such constructs—both $100 bills will show as authentic. Were we to apply single-region digital fingerprinting to those bills, they also would authenticate (since half the bill is more than enough for a good authentication? In this case, it should not be authenticated, and the teachings of this patent apply. Even though very large regions of the bill would show as genuine, the desired result is that the overall bill should fail. This patent ensures it does by requiring authentication of multiple regions of the bill.

The size of these regions depends on many things, including how small the pieces of a counterfeit bill may be. The number and location of those regions should be sufficiently widely distributed that it is infeasible to do a "cut and paste" and get a counterfeit worth producing. These regions can be chosen manually (perhaps for all bills) or programmatically.

Where they are located and their sizes can be chosen for uniform distribution, randomly, through the use of a Latin Hypercube approach, or many other means understood in the art. If they are different for each bill, the template for finding them at authentication can be created or stored in many ways, including indexing it in a database linked to the bill's serial number. That serial number can be acquired in different ways. It can, for example, be read off the bill using optical character recognition or entered manually. Alternatively, the entire bill can be sent to authentication and whatever bill it best matches, that bill becomes the purported identity of the bill and its serial number used. For greater security, the regions used for authentication may be kept confidential. The randomly-chosen approach mentioned above makes this straightforward.

To authenticate the bill, a large percentage of the area of the bill must fall in templated regions that must individually authenticate. Anything in excess of 50% of the area of the bill showing a digital fingerprint match would ensure that two bills cannot be split as discussed above and still yield two authenticatable $100 bills. If the regions are chosen randomly, uniformly, or in a Latin Hypercube arrangement, far less than half the bill need be attempted to authenticate to discover that half has been replaced.

In this example, the content of the regions is not important. Their positioning is based on the template and the regions to be matched clearly must align with the template or they will not be seen, but for this example there is no need to determine whether such a region has been offset from its correct position by more than an allowed amount.

Passports. A passport is not authentic unless the correct information is printed on or affixed to a government-created passport blank. This information comprises a photograph of the person, two name fields, a passport number, the country, the person's birth date, the place of issue, issue date, expiration date, and others. For the passport to be authentic, the blank (background) must be authentic, virtually all the information fields must be shown to have the correct content, and the photograph must be the original.

As discussed previously, there are two kinds of templates in view here. The first, used on the background (the regions of the passport that are printed prior to putting any person-specific information on the passport. To be authentic, a passport must be printed on a government-produced blank. Significant background areas remain after the passport is completed and can be authenticated using the kind of pseudo-random template discussed under currency above.

The other kind of template in use in this embodiment is more standard. It covers regions that must have authentic content in order for the passport to be authentic. Authenticating "content" in each case in the passport means confirming "what the text says" for the textual regions. The photograph can be authenticating by matching its digital fingerprint with the photograph's analog in the reference set, my doing a direct image match, or by other methods known in the art. In addition, it is probably desirable that the textual regions' digital fingerprints, as well as their textual contents, match on the text regions.

Further confidence in authenticity is obtainable—and in view in this patent—if the templated fields are in their correct locations (up to a small error) both on the background and with respect to each other.

Wills. In one embodiment a will needs to be authenticated. To be authentic a will must be an unaltered original signed by the person. To determine that it is the one originally signed by the person, the signature and the paper on which the will is printed must be authenticated. The signature can be authenticated using digital fingerprinting (with a known region location) or by other means known in the art. The paper can be authenticated as with the currency and passport examples. With a multi-page will, each page must be authentic and all pages in the original must be present with no additions.

Wills differ somewhat from previous examples in that all the content must be unchanged. A will signed by the correct person, and on the original paper, but where the contents have been altered, is not an authentic will. Ensuring the content as authentic can be as straightforward as reading the content at authentication and comparing with the original stored in the reference file. It can also be done by requiring that all regions of the document have digital fingerprints that match the original. These or any other way of verifying content are in view in this patent.

Printed circuit boards. In one embodiment a printed circuit board needs to be authenticated. Note that the description here applies to the same items (printed circuit boards) as one embodiment of 0682 and with the same intent—finding replaced components. There are several differences here (as mentioned above), however. One of the most important is that under this patent the system is told which regions are most important while in that one we look for regions on the circuit board that are deficient in matches. The two approaches can also be combined to authenticate a printed circuit board.

The templating required here is just like the templating in the passport for the fields of known location (because the components are supposed to be in a known location). The contents of those regions are their digital fingerprints.

"Identification" and "Authentication"

The current patent deals primarily with authentication (though identifying the object or using some method such as a serial number to identify what object this purports to be is certainly a region of this patent, since you cannot authenticate an object if you don't know what it is supposed to be.

"Identification" means determining what particular object is before us. We must be careful here to distinguish purported identification and real identification. Purported identification is determining which particular object the object before us claims to be. The serial number on a Federal Reserve note or on a passport tell us what particular note or passport the one before us claims to be. But it doesn't actually identify the object. Digital fingerprinting of the object before us and successfully matching that digital fingerprint with one in a reference database collected when provenance was assured is necessary for identification.

In a case where there is no possibility or consequence of the object having been modified, matching any reasonable portion of the digital fingerprint of the current object with that of an object in the reference database is sufficient for identification (whether or not there is a serial number. All the serial number does is tell us which one to check against. Without a serial number, we have to check every item of the same kind as the object before us. So "identification" means determining which item is before us, but it may not determine whether the object is completely authentic (only that the region where the matched digital fingerprint came from is authentic). For something like a unitary machined part, for example, identification as described here is sufficient for authentication.

Matching Points of Interest

Figure 4:
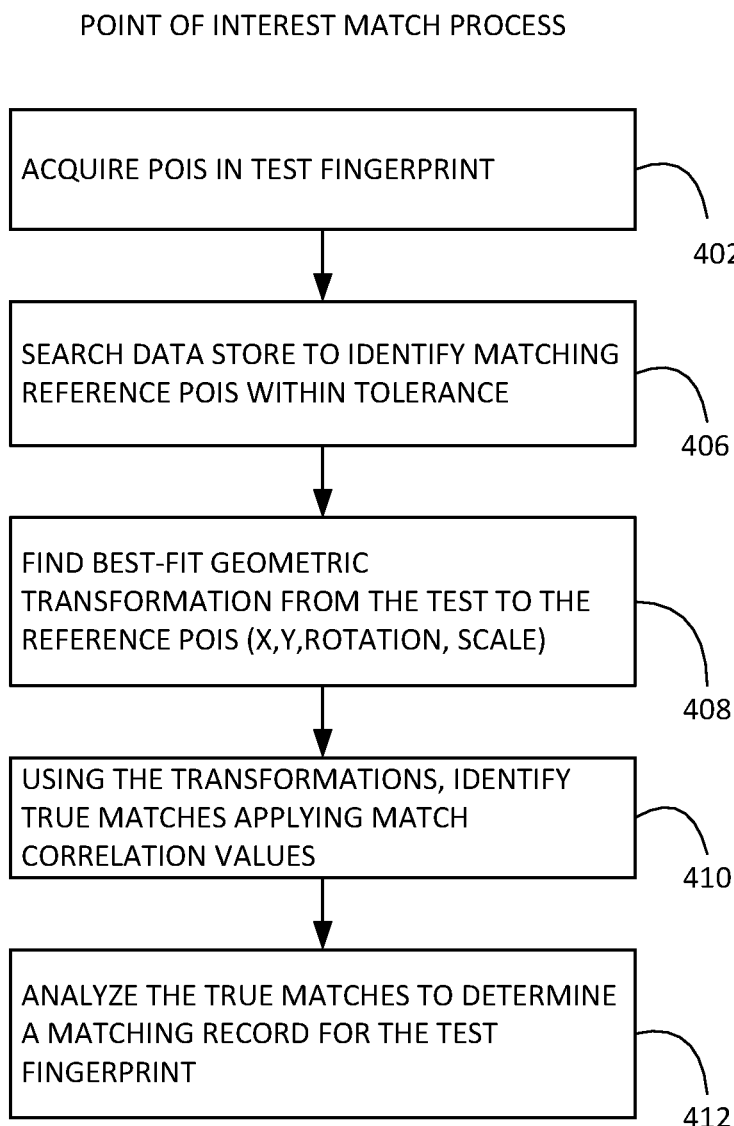
FIG. 4 is a simplified flow diagram of a point of interest matching process useful in matching digital fingerprints of a physical object.

FIG. 4 shows an example of a process for matching points of interest ("POIS") of a region. The POIS are acquired in a test object fingerprint, block 402. Next the process calls for searching or querying a database to identify matching reference POIS within a given tolerance, block 406. The process then finds a best-fit geometric transformation from the test object POIS to the identified matching POIS, block 408. Preferably, the transformation includes ΔX, ΔY, rotation and scale. The goal here is to compensate for variations in equipment, setup, lighting, etc. between the original induction of the reference object and the current scanned image data of the unknown or test object. Then the best-fit transformation is applied to the test object digital fingerprints and a match correlation value determined for each of them, block 410. The digital fingerprints that exceed a threshold match correlation value may be called "true matches." At block 412, the process analyzes the true matches to identify a matching reference record for the test object digital fingerprint.

Figure 5:
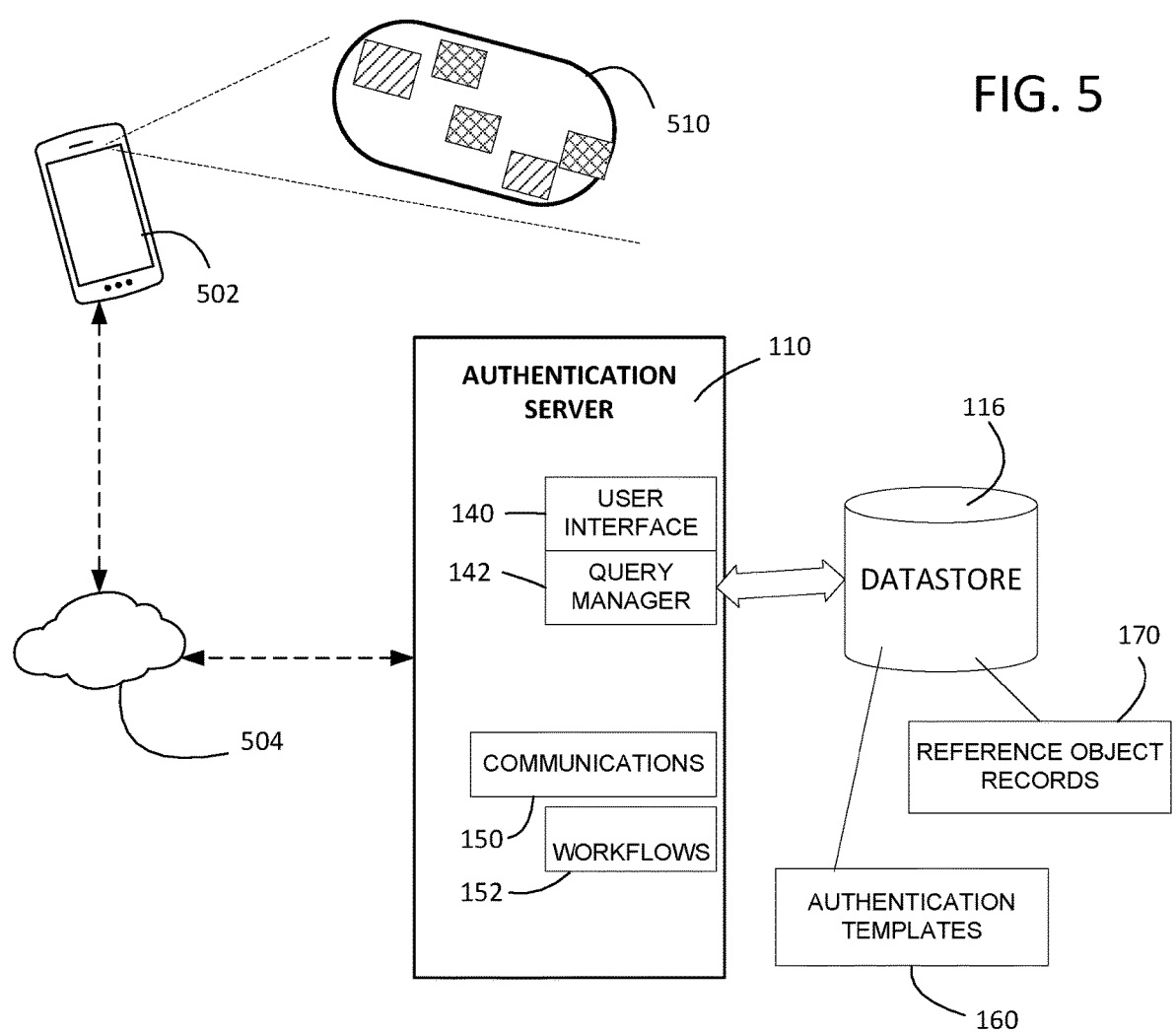
FIG. 5 is a simplified block diagram of another example of a computer-implemented authentication system consistent with the present disclosure.

FIG. 5 is a simplified diagram of another example of a computer-implemented authentication system consistent with the present disclosure. Here, the authentication server 110 and associated datastore may be generally the same as previously described with regard to FIG. 1. In this case, a smart phone 502 having an internal camera is used to capture image data of an object 510. In an embodiment, the smart phone may have software for processing the image data to extract digital fingerprints. In some embodiments, the smart phone may transmit image data over a network 504 (ethernet, internet, for example) to another processor. It may transmit raw image data or processed digital fingerprints to the authentication server 110. In an embodiment, the smart phone has software to request authentication services, and receive authentication results, for example, via the user interface 140 of the authentication server 110 and the user interface of the smartphone. Thus, the authentication processes described above may be conducted at virtually any location. One use case may be where the physical object is difficult or impossible to move, or where it may not be moved due to practical, contractual, or regulatory restrictions.

Digital Fingerprinting

"Digital fingerprinting" refers to the creation and use of digital records (digital fingerprints) derived from properties of a physical object, which digital records are typically stored in a database. Digital fingerprints maybe used to reliably and unambiguously identify or authenticate corresponding physical objects, track them through supply chains, record their provenance and changes over time, and for many other uses and applications including providing secure links between physical and digital objects as described above.

In more detail, digital fingerprints typically include information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a database to an object. Thus, in general, a digital fingerprint may be derived from a first object directly, or it may be derived from a different object (or file) linked to the first object, or a combination of the two (or more) sources. In the audio example, the audio file may be a recording of a person speaking a particular phrase. The digital fingerprint of the audio recording may be stored as part of a digital fingerprint of the person speaking. The digital fingerprint (of the person) may be used as part of a system and method to later identify or authenticate that person, based on their speaking the same phrase, in combination with other sources.

In the context of this description a digital fingerprint is a digital representation of the physical object. It can be captured from features of the surface, the internals, the progression of the object in time, and any other repeatable way that creates a digital fingerprint that can be uniquely and securely assigned to the particular digital object. Though not mentioned herein, secure protection of the physical object, its digital fingerprint, and of the associated digital objects are assumed.

In the context of this document, a digital fingerprint is a natural "digitization" of the object, obtainable unambiguously from the digital object. It is the key to the digital object, providing the link between the physical object and the digital. These digital fingerprints, in order to accomplish the kind of physical-digital linkage desired, must have certain properties. Our approach has these properties, while many other forms of digital fingerprinting do not. Among these properties are:

The digital fingerprint must be unambiguously derived from a single individual object.

It must remain matchable (to a corresponding data store record) with high confidence even as the individual object ages, wears, or is otherwise changed.

Returning to the 2-D and 3-D object examples mentioned above, feature extraction or feature detection may be used to characterize points of interest. In an embodiment, this may be done in various ways. Two examples include Scale-Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB etc. SIFT and SURF are most useful approaches to detect and matching of features because of it is invariant to scale, rotate, translation, illumination, and blur." MISTRY, Darshana et al., *Comparison of Feature Detection and Matching Approaches: SIFT and SURF*, GRD Journals—Global Research and Development Journal for Engineering|Volume 2|Issue 4|March 2017.

In some embodiments, digital fingerprint features may be matched, for example, based on finding a minimum threshold distance. Distances can be found using Euclidean distance, Manhattan distance etc. If distances of two points are less than a prescribed minimum threshold distance, those key points may be known as matching pairs. Matching a digital fingerprint may comprise assessing a number of matching pairs, their locations or distance and other characteristics. Many points may be assessed to calculate a likelihood of a match, since, generally, a perfect match will not be found. In some applications an "feature template" may be used to define locations or regions of interest for a class of objects.

In an embodiment, features may be used to represent information derived from a digital image in a machine-readable and useful way. Features may be point, line, edges, and blob of an image etc. There are areas as image registration, object tracking, and object retrieval etc. that require a system or processor to detect and match correct features. Therefore, it may be desirable to find features in ways that are invariant to rotation, scale, translation, illumination, noisy and blur images. The search of interest points from one object image to corresponding images can be very challenging work. The search may preferably be done such that same physical interest points can be found in different views. Once located, points of interest and their respective characteristics may be aggregated to form the digital fingerprint (generally including 2-D or 3-D location parameters).

In the context of this description a digital fingerprint is a digital representation of the physical object. It can be captured from features of the surface, the internals, the progression of the object in time, and any other repeatable way that creates a digital fingerprint that can be uniquely and securely assigned to the particular digital object. Though not mentioned herein, secure protection of the physical object, its digital fingerprint, and of the associated digital objects are assumed.

Put another way, a digital fingerprint is a natural "digitization" of the object, obtainable unambiguously from the digital object. It is the key to the digital object, providing the link between the physical object and the digital. These digital fingerprints, in order to accomplish the kind of physical-digital linkage desired, must have certain properties. Among these properties are:

The digital fingerprint must be extracted unambiguously from a single individual object.

It must remain matchable with high confidence as the individual object ages, wears, or is otherwise changed.

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object.

Scanner elements may be discrete or integrated. For example, the scanner may be a camera in a smartphone, and the digital fingerprinting process may be an app on the same smartphone. Alternatively, intermediate data (for example, digital image data) may be transmitted over a network to a remote processor.

Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function. Attestable trusted scanners should be used to provide images for digital fingerprint creation. Scanner may be a single device or a multitude of devices and scanners working to enforce policy and procedures.

More information about digital fingerprinting is set forth below and can be found in various patents and publications assigned to Alitheon, Inc. including, for example, the following: DIGITAL FINGERPRINTING, U.S. Pat. No. 8,6109,762; OBJECT IDENTIFICATION AND INVENTORY MANAGEMENT, U.S. Pat. No. 9,152,862; DIGITAL FINGERPRINTING OBJECT AUTHENTICATION AND ANTI-COUNTERFEITING SYSTEM, U.S. Pat. No. 9,443,298; PERSONAL HISTORY IN TRACK AND TRACE SYSTEM, U.S. Pat. No. 10,037,537; PRESERVING AUTHENTICATION UNDER ITEM CHANGE, U.S. Pat. App. Pub. No. 2017-0243230 A1. Each of these patents and publications is hereby incorporated by this reference.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method to authenticate a composite physical object, the method comprising:

selecting a class of objects to which the composite physical object belongs;

accessing a stored template provided for authenticating objects of the selected class of objects;

identifying the regions of the object specified in the template as required for authentication;

scanning at least the identified regions of the composite physical object to acquire image data for each identified region;

processing the acquired image data to extract digital fingerprints of each of the identified regions, wherein each digital fingerprint is based solely on one or more native features of the composite physical object and not based on any identifier, label, or other proxy added to the composite physical object for identification or authentication;

based on the digital fingerprints, querying a database of reference objects of the selected class of objects to obtain a matching record, wherein the matching record requires that each and every identified region of the composite physical object match a corresponding region of a reference object in the matching record, based on the corresponding digital fingerprints, within a selected tolerance; and determining authenticity of the composite physical object based on the matching record, wherein:

the selected class of composite physical objects is electronic apparatus;

the corresponding template includes a list of components required to be mounted in the electronic apparatus as a condition of authentication regardless of their locations; and matching requires matching each of the required components to corresponding components in a reference database based on their digital fingerprints.

2. The computer-implemented method of claim 1, wherein the template specifies a content for at least one of the identified regions of the composite physical object, as a requirement for authentication of the composite physical object; and the method further comprising:

extracting content from the corresponding acquired image data of each of the at least one region of the physical object that requires specified content for authentication;

for each of the said regions, comparing the extracted content to the corresponding specified content to generate results; and analyzing the results of all of the comparisons to the determination of authenticity of the composite physical object.

3. The computer-implemented method of claim 2 wherein:

the template further specifies, for at least one of the regions having specified content, at least one criterion for analyzing the comparison of the extracted content to the corresponding specified content; and the analyzing step is arranged to implement the at least one criterion specified in the template.

4. The computer-implemented method of claim 2 wherein the template includes limits on positional variance and the method includes applying the limits in the step of comparing the determined location(s) to the corresponding specified location(s).

5. The computer-implemented method of claim 2 further comprising analyzing content of a region by:

comparing semantic meaning of the content of the region to corresponding semantic meaning provided in the template; and comparing digital fingerprints of the region to digital fingerprints of a corresponding region of a reference database.

6. The computer-implemented method of claim 1 wherein:

at least some of the regions of the object specified in the template as required for authentication correspond to components mounted in the electronic apparatus.

7. The computer-implemented method of claim 6, wherein the electronic apparatus is a printed circuit board.

8. The computer-implemented method of claim 1 wherein the template specifies a corresponding location of at least one of the identified regions of the physical object; and the method further comprises:

determining a location of the at least one of the identified regions based on the template;

comparing the determined location(s) on the object to the corresponding specified location(s) from the template; and conditioning the determination of authenticity based on comparing the determined location(s) on the object.

9. The computer-implemented method of claim 8 wherein the location is specified in the template relative to a second one of the identified regions.

10. The computer-implemented method of claim 8 wherein the location is specified in the template relative to the physical object as a whole.

11. The computer-implemented method of claim 8 wherein the location is specified as X, Y (or X, Y, Z or X, Y, Z, T) coordinates and extent of a representative portion of the physical object.

12. The computer-implemented method of claim 1 wherein the identified regions are specified in the template by respective locations and extents.

13. The computer-implemented method of claim 1 wherein the identified regions are specified in the template by respective locations, extents, and contents.

* * * * *